United States Patent [19]

Buck et al.

[11] Patent Number: 4,856,329
[45] Date of Patent: Aug. 15, 1989

[54] HEAT TRANSFER MEASUREMENT DEVICE, IN PARTICULAR FLOW MONITOR

[76] Inventors: Robert Buck, 7992 Tettnang, Vogelherdbogen 67; Gerd Marhofer, 4300 Essen 1, Beckmannsbusch 67, both of Fed. Rep. of Germany

[21] Appl. No.: 172,457

[22] Filed: Mar. 24, 1988

[30] Foreign Application Priority Data

Apr. 27, 1987 [DE] Fed. Rep. of Germany ....... 3713981

[51] Int. Cl.$^4$ .............................................. G01F 1/68
[52] U.S. Cl. .............................. 73/204.22; 73/204.26
[58] Field of Search ............................ 73/204, 204.22

[56] References Cited

U.S. PATENT DOCUMENTS

| 3,400,582 | 9/1968 | Warner | 73/204 X |
| 3,800,592 | 4/1974 | Jones, Jr. | 73/204 X |
| 4,480,467 | 11/1984 | Harter et al. | 73/204 |
| 4,616,505 | 10/1986 | Jouwsma | 73/204 |

FOREIGN PATENT DOCUMENTS 197709  9/1977  U.S.S.R. ...................... 73/204

Primary Examiner—Herbert Goldstein
Attorney, Agent, or Firm—Browdy and Neimark

[57] ABSTRACT

A heat transfer measurement device, in particular a flow monitor for the electrical measurement of heat losses in a flowing medium, with a metallic, circular cylindrical measurement device housing having an outside thread, with a first temperature measurement element, a heating element and a second temperature measurement element. The flow monitor in accordance with the invention is on the one hand quick in a thermal sense and can be manufactured relatively simply on the other. This is because the first temperature measurement element, the heating element and the second temperature measurement element are disposed on one side of a carrier foil which is a good electrical insulator as well as a good conductor of heat and in that the carrier foil is brought into thermally conductive contact with the measuring device housing with its side facing away from the temperature measurement elements and the heating element, at least in those areas where the temperature measuring elements and the heating element are disposed.

28 Claims, 3 Drawing Sheets

HEAT TRANSFER MEASUREMENT DEVICE, IN PARTICULAR FLOW MONITOR

BACKGROUND OF THE INVENTION

1. Field of the Invention

The invention relates to a heat transfer measurement device, in particular a flow monitor for the electrical measurement of heat losses in a flowing medium, with a preferably metallic, circular cylindrical measurement device housing having an outside thread, with a first temperature measurement element, with at least one heating element and a second temperature measurement element.

2. The Prior Art

Heat transfer measurement devices of the type discussed, i.e., in particular calorimetrically operating flow monitors, have been known for some time and in many different embodiments (see, for example, German Laid-open Patent Applications DE-OS Nos. 24 47 617, 26 29 051, 32 13 902 and 32 22 046). By means of these heat transfer measuring devices, hereinafter always designated as flow monitors, the temperature difference is measured. The first temperature measurement element measures a temperature determined by the heating element and the flowing medium, hereinafter called measurement temperature, while the second temperature measurement element measures a temperature, if possible not determined at all or determined in another way, by the heating element and by the flowing medium, hereinafter called reference temperature. Thus the first temperature measurement element, the heating element and the second temperature measurement element—as well as an evaluation circuit of no further interest here—are required for the operation of the flow monitors herein discussed.

If the medium the flow of which is to be monitored is a gas, the operationally required components—first temperature measurement element, heating element and second temperature measurement element—can be introduced into the gas flow more or less unprotected. However, if the flow of a liquid medium is to be monitored, the components required for operation—first temperature measurement element, heating element and second temperature measurement element—cannot be simply introduced into the liquid medium flow and it is necessary to dispose these components while protected inside a measurement device housing.

In a flow monitor of the type described above and already realized in actual use (see German Laid-open Application DE-OS No. 32 13 902), the measurement device housing is constructed in an offset manner. The first temperature measurement element and the heating element are located in the thinner part of the measurement device housing, while the second temperature measurement element is located in the thicker part of the measurement device housing in the end oriented towards the thinner part. The first temperature measurement element and the heating element are disposed in an aluminum disc. The aluminum disc provides the thermal connection between the front face of the measuring device housing and the first temperature measurement element on the one side and the heating element on the other side. The first temperature measurement element, the heating element and the aluminum disc are cast in an epoxy resin which is a good thermal conductor. The second temperature measurement element is located at a distance of approximately 1 cm from the front face of the measurement device housing and is also cast in an epoxy resin which is a good thermal conductor. Since the heat of the heating element is not intended to reach the second temperature measurement element, material which is a good thermal insulator is placed between the area which the first temperature measurement element and the heating element are disposed and the area where the second temperature measurement element is disposed.

SUMMARY OF THE INVENTION

The flow monitor previously described, which is the basis of the invention, is on the one hand relatively sluggish in a thermal sense and, on the other, is relatively expensive to manufacture. It is therefore an object of the invention to define a flow monitor of the type discussed which on the one hand reacts quickly in a thermal sense and, on the other, can be manufactured less expensively.

The heat transfer measurement device of the invention, i.e. the flow monitor according to the invention, by means of which the object derived and described above has been attained, is first and most importantly characterized in that the first temperature measurement element, the heating element and the second temperature measurement element are disposed on one side of a carrier foil which is a good electrical insulator as well as a good conductor of heat and in that the carrier foil is brought into thermally conductive contact with the measuring device housing with its side facing away from the temperature measurement elements and the heating element, at least in those areas where the temperature measuring elements and the heating element are attached. The carrier foil preferably consists of polyimide and has a thickness of approximately 50–150 $\mu$m, in particular approximately 75 $\mu$m. Such a carrier foil has an extremely low thermal resistance and is a good electrical insulator; the disruptive voltage of such a carrier foil is many thousand volts.

Due to the face that in the flow monitor according to the invention the components required for operation—first temperature measurement element, heating element and second temperature measurement element—can be applied in a thermal way for all practical purposes directly to the corresponding inner surfaces of the measurement device housing, the flow monitor according to the invention is thermally particularly quick. Since furthermore, it is not required to cast the operational components of the flow monitor according to the invention—first temperature measurement element, heating element, second temperature measurement element—in an epoxy resin which is thermally well conductive, the flow monitor according to the invention can be manufactured considerably cheaper than the flow monitor on which the invention is based.

BRIEF DESCRIPTION OF THE DRAWINGS

The essential teaching of the invention described above may be embodied and improved in different ways which will be described below by means of exemplary embodiments shown in the drawings, in which.

DETAILED DESCRIPTION OF THE PREFERRED EMBODIMENTS

Figure 1:
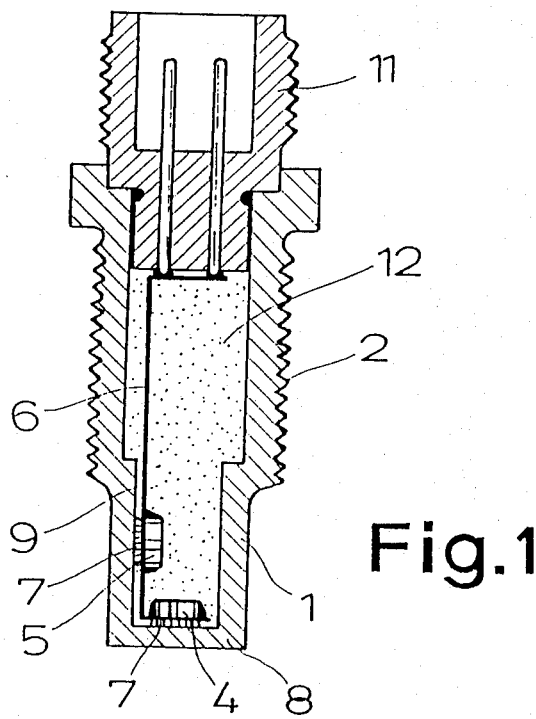
FIG. 1 is a schematic section through a first exemplary embodiment of the flow monitor according to the invention.

The heat transfer measurement device shown in the drawings is a flow monitor for the electrical measurement of heat losses in a flowing medium and is comprised of a metallic, circular cylindrical measurement device housing 1 provided in part (FIGS. 1 and 3) or wholly (FIG. 5) with an outer thread 2, a first temperature measurement element 3, a heating element 4 and a second temperature measurement element 5. The flow monitors shown in the drawings work on the differential temperature measurement principle. The first temperature measurement element 3 measures a temperature determined by the heating element 4 and the flowing medium, hereinafter called measurement temperature, while the second temperature measurement element 5 measures a temperature, if possible not determined at all or determined in another way, by the heating element 4 and by the flowing medium, hereinafter called reference temperature. A first temperature measurement element 3, a heating element 4 and a second temperature measurement element 5 are therefore required for the operation of the flow monitors shown.

The monitoring of the flow of a liquid medium (or of an aggressive medium) is to be monitored by means of the flow monitor according to the invention, therefore the components required for the operation—first temperature measurement element 3, heating element 4 and second temperature measurement element 5—cannot be simply introduced into the flow of the liquid and the components required for the operation are therefore disposed inside the measurement device housing 1.

In accordance with the invention the first temperature measurement element 3, heating element 4 and second temperature measurement element 5 are attached on one side of a carrier foil 6 which is a good electrical insulator and a good thermal conductor and the carrier foil 6 is brought into thermally conductive contact with the measurement device housing 1 on its side oriented away from the temperature measurement elements 3, 5 and the heating element 4—at least in the areas where the temperature measurement devices 3, 5 and the heating element 4 are disposed. The carrier foil 6 preferably consists of polyimide and has a thickness of approximately 50 to 150 μm, in particular approximately 75 μm.

The flow monitor in accordance with the invention is particularly quick in a thermal sense, because the first temperature measurement element 3, the heating element 4 and the second temperature measurement element 5 are disposed for all practical purposes thermically directly on the inner surfaces of the measuring device housing 1. In order to further improve the thermal conductivity between the first temperature measurement element 3, the heating element 4 and the second temperature measurement element 5 on the one hand and the inner surfaces of the measuring device housing 1 on the other, heat conducting paste 7 is provided between the carrier foil 6 and the measuring device housing 1 in the areas where the temperature measurement elements 3, 5 and the heating element 4 are disposed.

Figure 2:
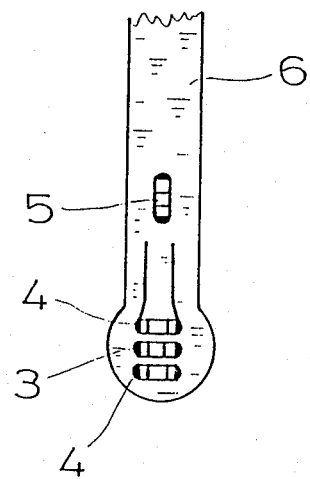
FIG. 2 is the carrier foil of the flow monitor in accordance with FIG. 1 with the components required for operation disposed thereon and in an enlarged view, as compared with FIG. 1.
Figure 6:
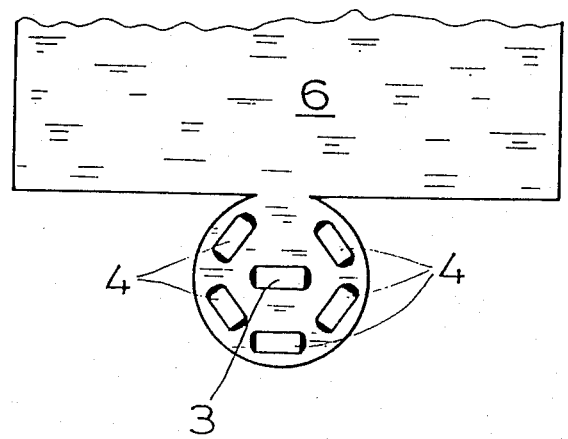
FIG. 6 is an enlargement of the carrier foil of a fourth exemplary embodiment of a flow monitor according to the invention, with a part of the components required for operation disposed thereon.

In the exemplary embodiment of the flow monitor according to the invention shown in FIGS. 1 and 2, the first temperature measurement element 3 and the heating element 4 are disposed on the front end of the measurement device housing 1, while the second temperature measurement element 5 is disposed on the cylinder jacket 9 at a distance from the front end 8 of the temperature measurement housing 1. As shown in FIG. 2, two heating elements 4 are provided in this exemplary embodiment and the first temperature measurement element 3 is disposed between the two heating elements 4. In contrast thereto an exemplary embodiment is shown in FIG. 6 in which several heating elements 4, namely five heating elements 4, are provided and the heating elements 4 are disposed in a circle around the first temperature measurement element 3.

Figure 3:
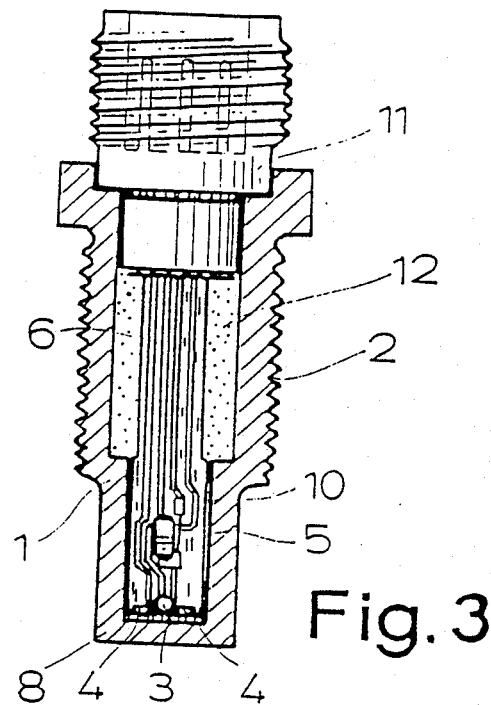
FIG. 3 is a schematic section through a second exemplary embodiment of the flow monitor according to the invention.
Figure 4:
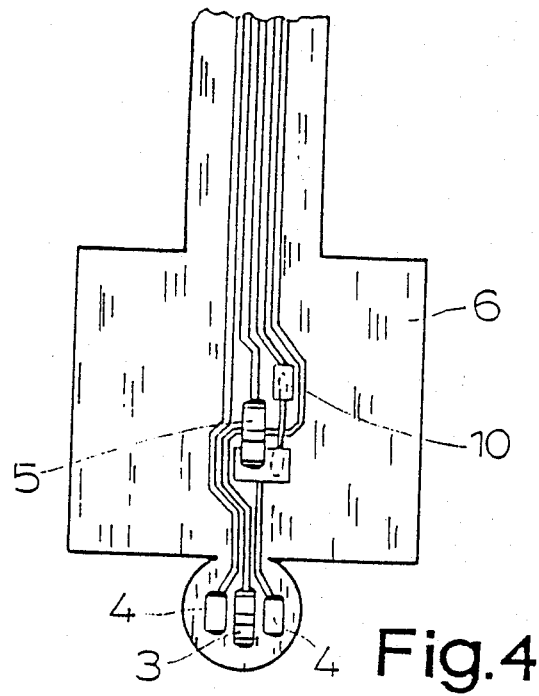
FIG. 4 is the carrier foil of the flow monitor in accordance with FIG. 3 with the components required for operation disposed thereon and in an enlarged view, as compared with FIG. 3.
Figure 5:
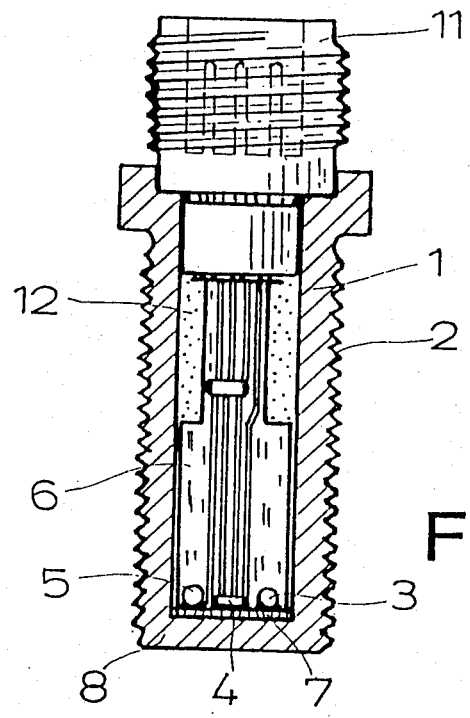
FIG. 5 is a schematic section through a third exemplary embodiment of the flow monitor according to the invention.

In contrast to the exemplary embodiment in accordance with FIGS. 1 and 2, FIGS. 3 to 5 show exemplary embodiments of the flow monitor according to the invention in which the first temperature measurement element 3 and the heating element 4 are disposed on the front end 8 of the measurement device housing 1. In FIG. 5 the heating element 4 is disposed between the first temperature measurement element 3 and the second temperature measurement element 5. These are exemplary embodiments of flow monitors according to the invention by means of which it is not only possible to determine whether the medium, the flow of which is to be monitored, does indeed flow, but is also possible to determine the direction of flow by means of these exemplary embodiments of the flow monitors according to the invention.

In all exemplary embodiments of flow monitors in accordance with the invention shown in the drawings, the first temperature measurement element 3, the heating element of elements 4 and the second temperature measurement element 5 are in the form of SMD components, i.e. partly MELF components, partly chip components. To the extent that the first temperature measurement element 3, the heating element or heating elements 4 and the second temperature measurement elements 5 are in the form of chip components they are disposed with the measuring layer or the heating layer resting on the carrier foil 6 (face down).

It is an important teaching of the invention that a carrier foil 6 which is a good electrical insulator and a good thermal conductor has been provided on which the first temperature measurement element 3, the heating element 4 and the second temperature measurement element 5 are disposed. As a result, the provision of further components, preferably further SMD components 10, on the carrier foil 6 suggests itself and is shown in FIGS. 3 and 4.

Finally, the drawings show preferred embodiments of flow monitors according to the invention to the extent that on the one hand the carrier foil 6 is directly connected with a connecting plug 11 and, on the other, the inside of the measurement device housing 1 is filled with a thermally well insulating material 12, preferably with polyurethane foam.

It should be understood that the above exemplary embodiments have been given by way of example only and that further variants and improvements are possible within the scope of the invention.

What is claimed is:

1. A flow measuring device for the electrical measurement of heat losses in a flowing medium, comprising:
   a housing formed as a cylindrical jacket with a front side at one end;
   a first temperature measurement element;
   at least one heating element;
   a second temperature measurement element; and
   a carrier foil having said first temperature measurement element, said at least one heating element and said second temperature measurement element disposed on one side thereof, said carrier foil being electrical insulating and thermal conducting,
   wherein said carrier foil being brought into thermally conductive contact with said housing with its side facing away from said temperature measurement elements and said at least one heating element, at least in those areas where said temperature measuring elements and said at least one heating element are disposed; and
   wherein said first temperature measurement element and said at least one heating element are disposed at the front side of said housing and said second temperature measurement element is disposed at a distance from said front side of said housing on the cylindrical jacket of said housing.

2. A flow measuring device in accordance with claim 1, wherein said carrier foil is made of polyimide.

3. A flow measuring device in accordance with claim 1, wherein said carrier foil has a thickness of approximately 50 to 150 $\mu$m.

4. A flow measuring device in accordance with claim 3, wherein said carrier foil has a thickness of approximately 75 $\mu$m.

5. A flow measuring device in accordance with claim 1, wherein heat conducting paste is provided between said carrier foil and said housing at least in the areas where said temperature measurement elements and said at least one heating element are disposed.

6. A flow measuring device in accordance with claim 1, wherein said at least one heating element comprises two heating elements and the first temperature measurement element is disposed between said two heating elements.

7. A flow measuring device in accordance with claim 1, wherein said at least one heating element comprises several heating elements of said heating elements are disposed in a circle around said first temperature measurement element.

8. A flow measuring device in accordance with claim 1, wherein said first temperature measurement element, said at least one heating element and said second temperature measurement element are in the form of surface mounted devices (SMD).

9. A flow measuring device in accordance with claim 8, wherein said first temperature measurement element, said at least one heating element and said second temperature measurement element are in the form of metal electrode face bonding (MELF) components.

10. A flow measuring device in accordance with claim 8, wherein said first temperature measurement element, said at least one heating element and said second temperature measurement element are in the form of chip components.

11. A flow measuring device in accordance with claim 10, wherein said first temperature measurement element, said at least one heating element and said second temperature measurement element are disposed with their measuring layer or their heating layer resting on said carrier foil.

12. A flow measuring device in accordance with claim 1, further comprising further components, such as further surface mounted devices (SMD), provided on said carrier foil.

13. A flow measuring device in accordance with claim 1, wherein said carrier foil is connected directly with a contact plug.

14. A flow measuring device in accordance with claim 1, wherein the inside of the measurement device housing is filled with a thermally well insulating material, such as polyurethane foam.

15. A flow measuring device for the electrical measurement of heat losses in a flowing medium, comprising:
   a housing having a front side at one end;
   a first temperature measurement element;
   at least one heating element;
   a second temperature measurement element; and
   a carrier foil having said first temperature measurement element, said at least one heating element and said second temperature measurement element disposed on one side thereof, said carrier foil electrical insulating and thermal conducting,
   wherein said carrier foil being brought into thermally conductive contact with said housing with its side facing away from said temperature measurement elements and said at least one heating element, at least in those areas where said temperature measuring elements and said at least one heating element are disposed; and
   wherein said first temperature measurement element, said at least one heating element and said second temperature measurement element are disposed on the front side of said housing and said at least one heating element is disposed between said two temperature measurement elements.

16. A flow measuring device in accordance with claim 15, wherein said carrier foil is made of polyimide.

17. A flow measuring device in accordance with claim 15, wherein said carrier foil has a thickness of approximately 50 to 150 $\mu$m.

18. A flow measuring device in accordance with claim 17, wherein said carrier foil has a thickness of approximately 75 $\mu$m.

19. A flow measuring device in accordance with claim 15, wherein heat conducting paste is provided between said carrier foil and said housing at least in the areas where said temperature measurement elements and said at least one heating element are disposed.

20. A flow measuring device in accordance with claim 15, wherein said at least one heating element comprises two heating elements and the first temperature measurement element is disposed between said two heating elements.

21. A flow measuring device in accordance with claim 15, wherein said at least one heating element comprises several heating elements and said heating elements are disposed in a circle around said first temperature measurement element.

22. A flow measuring device in accordance with claim 15, wherein said first temperature measurement element, said at least one heating element and said second temperature measurement element are in the form of surface mounted devices (SMD).

23. A flow measuring device in accordance with claim 22, wherein said first temperature measurement element, said at least one heating element and/or said second temperature measurement element are in the form of metal electrode face bonding (MELF) components.

24. A flow measuring device in accordance with claim 22, wherein said first temperature measurement element, said at least one heating element and said second temperature measurement element are in the form of chip components.

25. A flow measuring device in accordance with claim 24, wherein said first temperature measurement element, said at least one heating element and said second temperature measurement element are disposed with their measuring layer or their heating layer resting on said carrier foil.

26. A flow measuring device in accordance with claim 15, further comprising further components, such as further surface mounted devices (SMD), provided on said carrier foil.

27. A flow measuring device in accordance with claim 15, wherein said carrier foil is connected directly with a contact plug.

28. A flow measuring device in accordance with claim 15, wherein the inside of the measurement device housing is filled with a thermally well insulating material, such as polyurethane foam.

* * * * *